March 25, 1930. K. A. BRAUNING 1,752,282
AUTOMOBILE LOCK MEANS
Original Filed Aug. 4, 1926   4 Sheets-Sheet 2
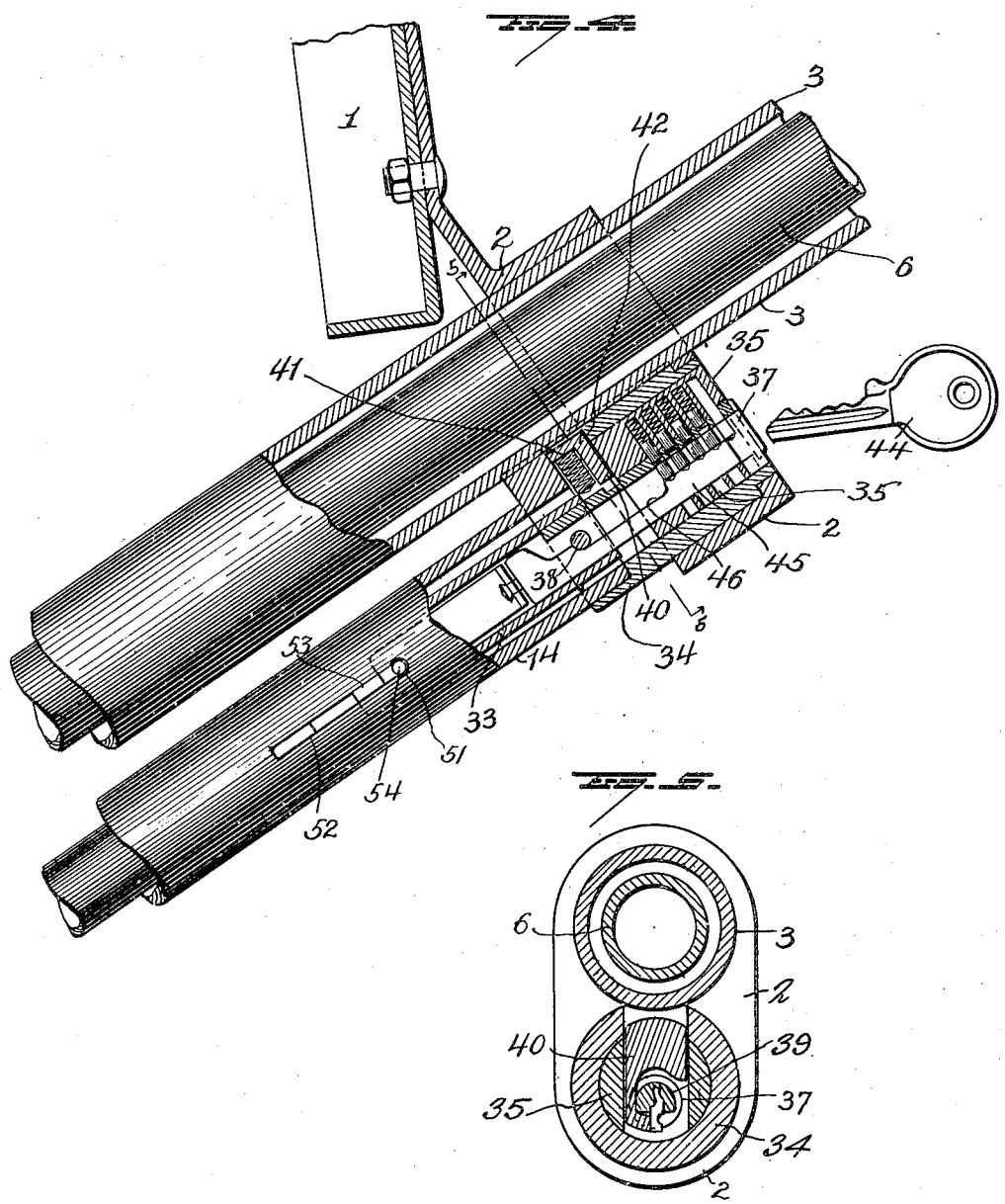

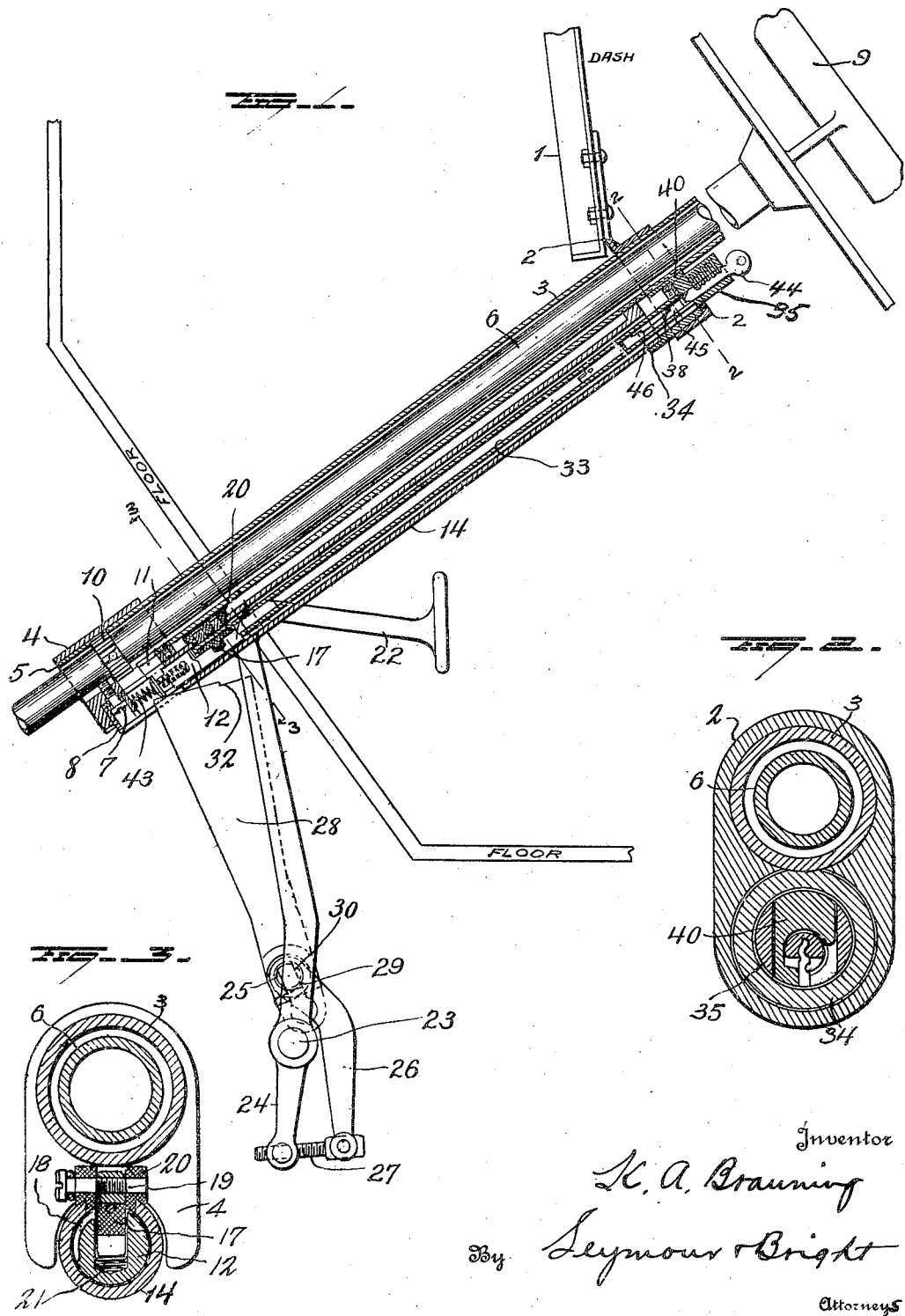

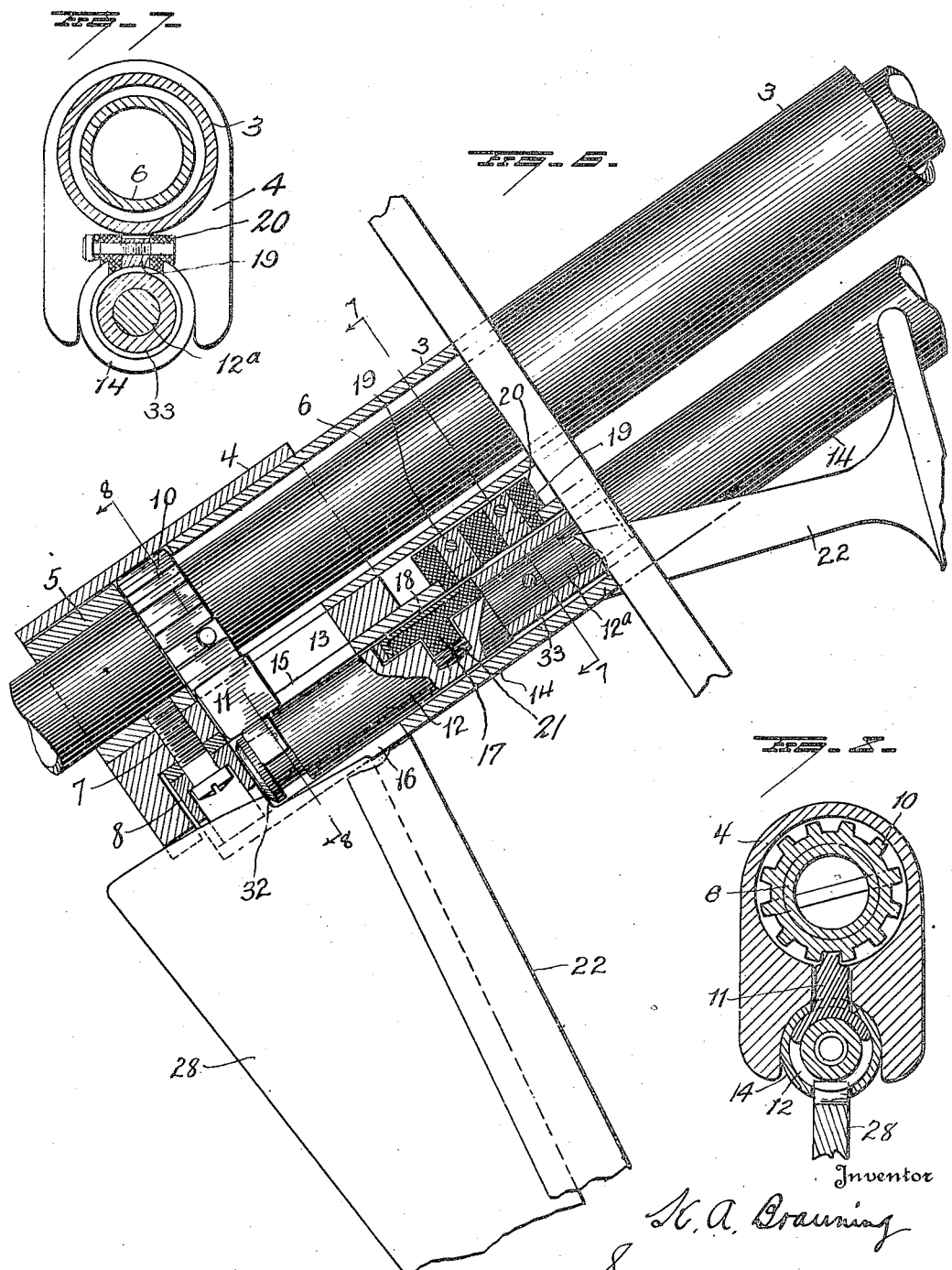

March 25, 1930.  K. A. BRAUNING  1,752,282
AUTOMOBILE LOCK MEANS
Original Filed Aug. 4, 1926  4 Sheets-Sheet 4
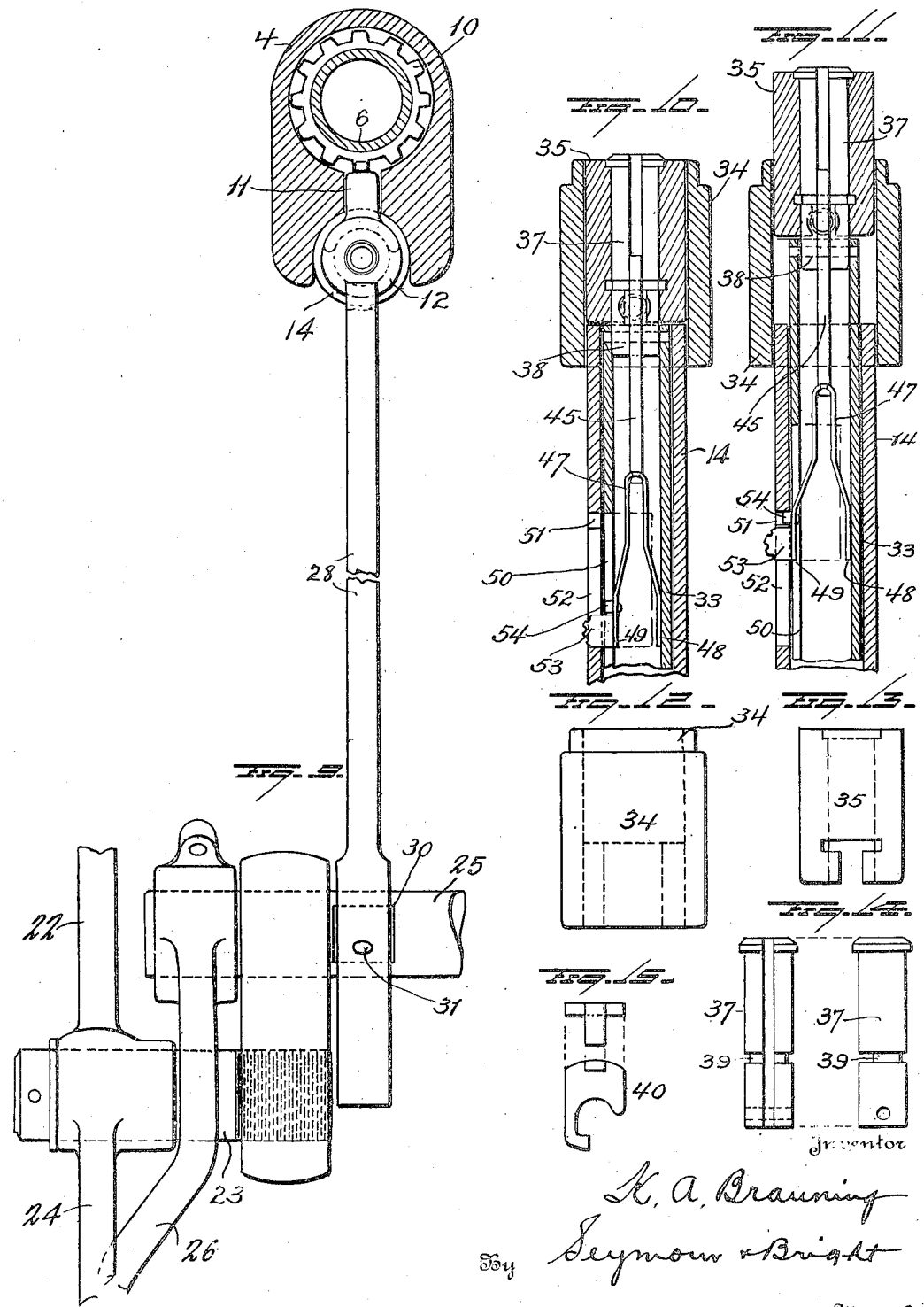

Patented Mar. 25, 1930

1,752,282

UNITED STATES PATENT OFFICE

KARL A. BRAUNING, OF STAMFORD, CONNECTICUT, ASSIGNOR TO THE YALE & TOWNE MANUFACTURING COMPANY, OF STAMFORD, CONNECTICUT

AUTOMOBILE LOCK MEANS

Application filed August 4, 1926, Serial No. 127,110. Renewed August 18, 1928.

This invention relates to improvements in locking means for automobiles, one object of the invention being to provide simple and efficient means which shall be operable to lock the ignition, steering wheel and the clutch pedal at a single operation.

A further object is to provide means which shall be operable to eject the key should the same be left in the lock when the mechanism is being operated to lock the several features of the automobile operating and controlling means.

With these and other objects in view, the invention consists in certain novel features of construction and combinations of parts as hereinafter set forth and pointed out in the claims.

In the accompanying drawings;

Figure 1 is a view partly in section and partly in elevation illustrating my improvements, the parts being shown in unlocked working positions;

Figure 2 is a transverse section on the line 2—2 of Figure 1;

Figure 3 is a transverse section on the line 3—3 of Figure 1;

Figure 4 is an enlarged sectional view partly in elevation and partly broken away showing certain features of the mechanism when in locked position, and illustrating the application of the key ejecting means;

Figure 5 is a transverse sectional view on the line 5—5 of Figure 4;

Figure 6 is an enlarged view partly in section and partly in elevation showing the locking means for the steering rod and the clutch pedal, and circuit breaking means for the ignition circuit;

Figure 7 is a transverse sectional view on the line 7—7 of Figure 6;

Figure 8 is a transverse sectional view on the line 8—8 of Figure 6;

Figure 9 is a view showing means for locking the pedal lever and the steering rod;

Figures 10 and 11 are sectional views illustrating different positions of the cylinder lock and the key ejecting means; and Figures 12, 13, 14 and 15 are views showing certain details.

A portion of a dash board is shown at 1, and has secured thereto, a bracket 2, through which a tubular steering column 3 passes. The lower portion of the steering column enters a housing 4, and in this housing, a bearing sleeve 5 for a steering rod 6 is secured by means of a screw 7, the latter also securing in place, a bracket 8, which constitutes an abutment for a spring as hereinafter explained. A steering wheel, as indicated at 9, is suitably secured to the upper end of the steering rod, and to the lower portion of said rod (within the housing 4) a toothed wheel 10 is secured, and adapted to receive a dog or key 11 to lock the steering rod and steering wheel. This locking dog or key is carried by a movable head 12 and is movable in a longitudinally slotted portion of the housing 4 and column 3, as indicated at 13, Figure 6. The bracket 8 is formed on the lower end of a tube 14 and the screw 7, passing through this bracket, also passes through the lower portion of said tube and the latter is thus secured to the housing 4. The tube 14 is slotted at 15 for the accommodation of the dog or key 11, and said tube is also slotted as at 16 for a purpose hereinafter explained. The head 12 which is movable longitudinally within the lower portion of the tube 14 is recessed for the accommodation of a block 17 of insulating material carrying a contact plate 18 to cooperate with contact pins 19 secured to a block 20 of insulating material carried by the tube 14. The contact pins 19 are included in the ignition circuit and the block 17 is pressed by a spring 21 to insure proper contact of the plate 18 with said pins to close the ignition circuit as shown in Figs. 1 and 3. It is apparent however, that when the head 12 has been moved to the position shown in Fig. 6, the contact plate 18 does not bridge the contact pins and hence, under this condition, the ignition circuit will be open and inoperative.

A clutch pedal 22 is mounted on a clutch pedal shaft 23 and provided with an arm 24 depending below said shaft. The clutch shaft is indicated at 25 and is provided with an arm 26,—said arms 24 and 26 being adjustably connected by a screw member 27. The clutch shaft 25 carries a cam or locking arm 28 and to facilitate the assembling of this arm on the shaft, it is provided near its lower end with a slot 29 having one end rounded to permit said arm to be slipped over the shaft 25 and the latter is flattened, as at 30, to be engaged by the parallel walls of the slot. A pin or key 31 may be employed to secure the arm 28 to the clutch shaft. The cam or locking arm 28 may be made flat and tapering and is provided on its wider upper edge with a shoulder 32. When the cam arm 28 is swung from the position shown in Figure 1 to the position shown in Figure 6, its upper end will pass through the slot 16 and the shoulder 32 will become disposed under the lower end of the movable head 12 and when said head is in the position shown in Figure 6 (and locked against movement as hereinafter explained), the cam arm 28 cannot move rearwardly and hence the clutch shaft will be locked.

The head 12 is provided with a shank 12ª which enters and is secured to the lower end portion of a locking tube 33. The upper end of the tube 14 is connected with a casing 34 and is secured, with said casing, to the steering column, by means of the clamping bracket 2.

The cylinder 35 of a cylinder lock is longitudinally movable in the casing 34 and the upper end of the locking tube 33 is connected with the plug 37 of this lock, as indicated at 38. The lock plug 37 carries a cam 39 for retracting a bolt 40, which latter is projected by means of a spring 41 to cause it to engage under a shoulder 42 at the lower portion of the casing 34 when the parts are in the locking positions shown in Figures 4 and 6. When the parts are in normal or unlocked positions, the cylinder lock will assume the position shown in Figure 1. That is to say, it will be projected upwardly from the upper end of the casing, being caused to assume such position (when unlocked) by the action of a spring 43 engaging the head 12 at the lower end of the locking tube 33 and abutting against the bracket 8 at the lower end of the tube 14.

When the clutch lever is depressed, the cam or locking arm 28 will be caused to assume the position shown in Figure 6, with the shoulder 32 disposed in alignment with the head 12. The operator will now press the cylinder lock inwardly from the position shown in Figure 1 to the position shown in Figure 4 and the bolt 40 will snap into engagement with casing 34 and thus secure the cylinder lock and parts connected therewith against movement. When the cylinder lock is moved inwardly as above explained, the tube 33 (being secured to the plug of said lock) will be moved downwardly and the head 12 brought against or in close proximity to the shoulder 32 on the cam arm 28, thus locking the latter, and consequently the clutch shaft, against manipulation by the pedal lever. During the same downward movement of the tube 33, the contact plate 18 will be moved downwardly relatively to the contact pins 19 thus disconnecting said pins and opening the ignition circuit. During the same downward movement of the tube 33, the dog or key 11 will be moved into engagement with the toothed wheel 10 on the steering rod 6 and thus lock said rod and the steering wheel.

From the above description, it will be seen that when the cylinder lock is pushed inwardly, the steering wheel and clutch shaft will be locked and that at the same time the ignition circuit will be opened, the engagement of the bolt 40 with the casing 34 locking the tube 33 and the parts movable therewith. To unlock, it is simply necessary to insert a proper key 44 into the plug of the cylinder lock and turn the same to release the bolt 40, when the spring 43 will force the head 12, tube 33 and cylinder lock upwardly, thus unlocking the cam arm 28 on the clutch shaft, and unlocking the toothed wheel 10 on the steering rod, and moving the contact plate 18 to position to bridge the contact pins 19 and thus close the ignition circuit. The car is now in normal operative condition.

Should the key 44 be left in the lock during the normal operation of the car, it is desirable that its removal shall be insured when the lock is pushed inwardly to effect the locking of the various parts. To cause the key to be ejected automatically when the lock is pushed inwardly, an ejector 45 may be employed. This ejector enters the plug 37 of the lock and also the locking tube 33 and may be guided by the pin 38 which enters an elongated recess 46 in said ejector. A spring 47 is attached to the ejector and located within the tube 33, said spring having two arms 48 and 49 to have friction engagement with the inner wall of said tube. The inner tube 33 is provided with a slot 50 having a rounded portion 51 at its upper end and the outer tube 14 is provided with a slot 52. A finger piece 53 carried by the arm 49 of the spring 47 passes through the slots 50 and 52, and a pin 54 carried by the same spring arm is movable in the slot 50 in the inner tube 33 and adapted to enter the hole or rounded portion 51 at the upper end of the slot 52 in the outer tube 14 when the parts are in the positions shown in Figure 11. Thus it will be seen that when the cylinder lock is in projected position, the ejector 45 will be caused to be locked against movement by engagement of the pin 54 in the hole 51 in the outer tube 14. Should the cylinder lock be now pressed inwardly (with the key in the plug of the lock), downward movement of the ejector 45 will be prevented and hence it will cause the key to be ejected as the cylinder lock moves downwardly, as indicated in Figure 4. In order that the key may be subsequently inserted into the plug of the lock, the ejector must first be moved downwardly to the position shown in Figures 1 and 10. This may be readily accomplished by depressing the finger piece 53 to release the pin 54 from the hole in the tube 14 and then downward pressure on the finger piece 53 will cause the ejector to move downwardly out of the way of the key.

Having fully described my invention what I claim as new and desire to secure by Letters-Patent, is:—

1. In automobile locking means, the combination with a steering column, and a clutch shaft, of a locking member supported by and movable longitudinally of the steering column, a circuit breaker for the ignition circuit, one member of said circuit breaker being carried by said locking member, an arm movable with said clutch shaft and having a part to be engaged by said locking member to lock the clutch shaft, and means for locking said locking member.

2. The combination with the steering means, ignition switch means, and clutch shaft means of an automobile, of operating means slidably supported by the steering column for simultaneously locking all of said means against operation, and means to lock said operating means.

3. In automobile locking means, the combination with a steering column, a steering wheel, a clutch shaft, a circuit breaker for the ignition circuit including a contact supported by the steering column, and a notched member connected with the steering wheel, of a longitudinally movable locking member supported by the steering column and carrying a member of said circuit breaker, a member movable with the clutch shaft and cooperable with the locking member to lock the clutch shaft, a part carried by the locking member and cooperable with said notched wheel to lock the steering wheel, and means for locking said locking member.

4. The combination with the steering column and control means of an automobile, of a longitudinally movable locking member for locking said control means, support means for said member associated with the steering column, and key controlled means adjacent to said steering column for locking said locking member, said key controlled means being bodily movable longitudinally with said locking member and cooperable with the support means to lock said member.

5. The combination with the steering column and control means of an automobile, of a longitudinally movable locking member for locking said control means, support means for said member associated with the steering column, and key controlled means adjacent to said steering column for locking said locking member, said key controlled means being bodily movable longitudinally with said locking member and cooperable with the support means to lock said member, said key controlled means constituting manually operable means for moving the locking member to locking relation to said control means.

6. The combination with the steering column and control means of an automobile, of a longitudinally movable locking member for locking said control means, support means for said member associated with the steering column, and key controlled means adjacent to said steering column for locking said locking member, said key controlled means being bodily movable longitudinally with said locking member and cooperable with the support means to lock said member, said key controlled means constituting manually operable means for moving the locking member to locking relation to said control means, and a spring for moving the locking member to unlocked relation to the control means and for projecting the key-controlled means.

7. The combination with the steering column and control means of an automobile, of a tube adjacent said steering column, a casing at the upper end of said tube, a locking member movable longitudinally in said tube, a lock connected with said locking member and movable in and beyond said casing with the locking member, and a locking bolt operable by the plug of the lock to lock the locking member to the tube.

8. The combination with the steering column and control means of an automobile, of a longitudinally movable locking member for locking said control means, support means for said member associated with the steering column, key controlled means adjacent to said steering column for locking said locking member, said key controlled means being bodily movable longitudinally with said locking member and cooperable with the support means to lock said member, and means operable automatically when the key-controlled means is moved downwardly to eject a key from the lock.

9. The combination with the steering column and control means of an automobile, of a tube adjacent said column, a casing at the upper end of said tube, a cylinder lock mounted in said casing and movable longitudinally, a locking member connected with the plug member of said lock, a key ejector entering the plug member of the lock, means to removably lock said ejector to said tube, and a locking bolt operable by the plug of said lock.

10. The combination with the steering column and control means of an automobile, of a tube adjacent said column, a casing at the upper end of said tube, a cylinder lock mounted in said casing and movable longitudinally, a locking member connected with the plug member of said lock, a key ejector entering the plug member of the lock, means to removably lock said ejector to said tube, and a locking bolt operable by the plug of said lock, the locking means for the ejector comprising a spring arm having a pin and said tube and locking member being slotted for the accommodation of said pin and said tube having a hole to receive the pin, and a finger piece on said spring arm and movable in the slotted portion of the tube.

11. The combination with the steering column of an automobile, and a steering rod rotatable in said column, of a toothed wheel secured to said steering rod, a tube adjacent to said column, a longitudinally movable locking member movable in said tube, a cylinder lock at the upper end of said member, and a dog or key carried by said member for cooperation with the toothed wheel on the steering rod.

12. The combination with the steering column of an automobile, and a steering rod rotatable in said column, of a toothed wheel secured to said steering rod, a tube adjacent to said column, a longitudinally movable locking member movable in said tube, a cylinder lock at the upper end of said member, a dog or key carried by said member for cooperation with the toothed wheel on the steering rod, said locking member comprising a tube connected at one end with the rotary member of said lock and a head at the lower end, said dog or key being carried by said head.

13. The combination with the steering head and clutch shaft of an automobile, of a cam arm movable with the clutch shaft, a locking member supported by the steering column and cooperable with said cam arm to lock the clutch shaft, means for operating said locking member, and means for locking said operating means.

14. The combination with the steering column of an automobile, of a tube adjacent thereto, a locking member longitudinally movable in said tube, a lock for locking said locking member, insulated contact supported by said tube and an insulated contact plate carried by said locking member.

15. The combination with the steering column and clutch shaft of an automobile, of a tube adjacent to said column, a locking member longitudinally movable in said tube, a lock for locking said locking member, and a cam arm movable with said clutch shaft and having a part to be engaged by said longitudinally movable locking member.

16. In a device of the class described, a sliding cylinder lock movable from a locking to an unlocking position, a key ejecting slide movable with said lock to its unlocking position, and means operative at the unlocking position for yieldingly holding said slide against movement with the cylinder back to locking position.

17. In a device of the class described, a cylinder lock adapted to reciprocate from locking to unlocking position, a key ejecting slide mounted in the key way of said lock and reciprocable therewith to its unlocking position, and means for preventing said slide from reciprocating with the lock from said unlocking position to locking position.

18. In a device of the class described, a cylinder plug lock adapted to reciprocate from locking to unlocking position, a key ejecting slide mounted in the keyway of the plug of said lock, said slide being freely reciprocable with said lock to its unlocking position, and yieldable means for preventing said slide from reciprocating with the lock from said unlocking position to locking position.

19. In a device of the class described, a cylinder lock movable from one extreme position to another, a key ejecting slide mounted in the keyway of said lock, said slide being movable with said lock from a particular one of said extreme positions to the other position, and means operable at said other position to prevent the slide from reciprocating with said lock in a reverse direction.

20. In a device of the class described, a cylinder plug lock movable from one extreme position to another, a key ejecting slide mounted in the keyway of the plug of said lock, said slide being movable with said lock from a particular one of said extreme positions to the other position, and yieldable means operable at said other position to prevent the slide from reciprocating with said lock in a reverse direction.

21. In a lock, a reciprocating locking bar, a cylinder lock adapted to lock the same in locked position, a key ejector mounted in the keyway of said cylinder lock, said key ejector being movable relatively to said reciprocating locking bar and cylinder to eject the key when the bar is reciprocated to locked position.

22. In a lock, a hollow reciprocating locking bar, support means for said bar, a key operated cylinder lock fixed to said bar and adapted to lock the same in locking position, a key ejector mounted in the keyway of said cylinder and having a portion extending into said hollow locking bar, means on said support for cooperating with that portion of the key ejector mounted in the locking bar to hold said ejector against movement whereby to eject the key when the locking bar and cylinder are reciprocated to locking position.

In testimony whereof, I have signed this specification.

KARL A. BRAUNING.